United States Patent [19]

Hirshfield et al.

[11] Patent Number: 4,862,143
[45] Date of Patent: Aug. 29, 1989

[54] METHOD AND APPARATUS FOR DETECTING COUNTERFEIT ARTICLES

[75] Inventors: Jay L. Hirshfield; Israel Nowik, both of Jerusalem, Israel

[73] Assignee: Isomed, Inc., Melville, N.Y.

[21] Appl. No.: 150,807

[22] Filed: Feb. 1, 1988

Related U.S. Application Data

[63] Continuation-in-part of Ser. No. 937,862, Dec. 4, 1986, Pat. No. 4,742,340.

[51] Int. Cl.⁴ .............................................. G08B 13/18
[52] U.S. Cl. .................................... 340/572; 250/302; 340/540; 340/600
[58] Field of Search ....................... 340/572, 540, 600; 250/302

[56] References Cited

U.S. PATENT DOCUMENTS 4,363,965 12/1982 Soberman et al. .................. 250/302
4,742,340 5/1988 Nowik et al. ....................... 340/540

*Primary Examiner*—Glen R. Swann, III
*Attorney, Agent, or Firm*—Armstrong, Nikaido, Marmelstein, Kubovcik & Murray

[57] ABSTRACT

A counterfeit detecting method and apparatus are provided for detecting the authenticity of an article having a label containing an isotope of a chemical element. The apparatus comprises a housing, a source of gamma radiation positioned in the housing, and a gamma radiation detector positioned in the housing for detecting the radiation from the source. The gamma radiation source is selected to emit radiation which can stimulate a selected nuclear transition in the label material. A calculating device, such as a microprocessor is coupled to a detector for calculating the ratio of the number of gamma rays counted by the detector during a predetermined period of time when the article is not in position near the receiving member ($N_O$) to the number of the gamma rays counted by the detector during a period of time equal to the predetermined period when the article is positioned near the receiving means ($N_R$), and for calculating the ratio of the number of gamma rays counted by the detector during the period of time when the article is not in position near the receiving means ($N_O$) to the number of gamma rays counted during a period of time equal to the predetermined period when the source is vibrated by the vibrating device ($N_E$) and for calculating the ratio ($N_R/N_O$)/($N_E/N_O$) and thus $N_R/N_E$. An output device provides an output indicating whether $N_R/N_E$ and $N_E/N_O$ are within a predetermined range.

Also, an article is provided capable of being authenticated, in which the article comprises a body substantially transparent to the gamma rays and a label fixed to the body. The label includes an isotope of a chemical element.

19 Claims, 2 Drawing Sheets

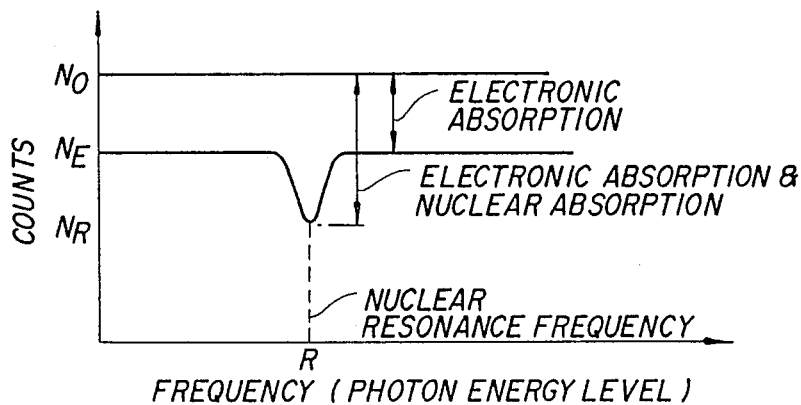
FIG. 1A (LABEL)
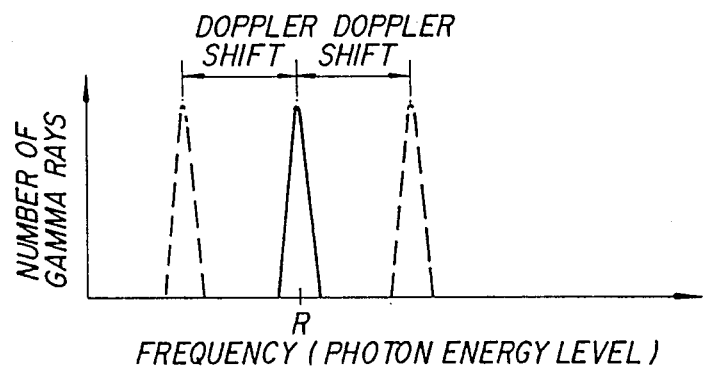
FIG. 1B (SOURCE)
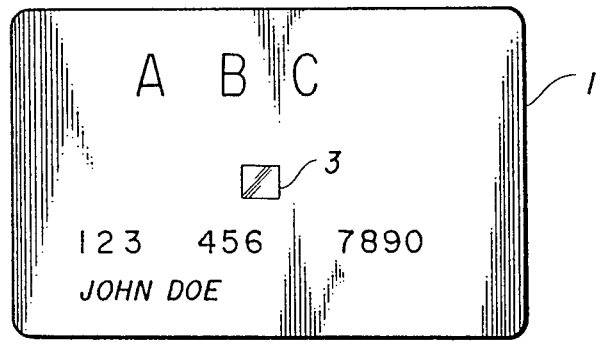
FIG. 2

1

METHOD AND APPARATUS FOR DETECTING COUNTERFEIT ARTICLES

RELATED APPLICATION

This application is a continuation-in-part of Application Ser. No. 937,862, filed on Dec. 4, 1986 now U.S. Pat. No. 4,742,340.

BACKGROUND OF THE INVENTION

1. Field of the Invention

The present invention is directed to a method and apparatus for authenticating legitimate articles and for detecting counterfeit articles. More particularly, the present application is directed to a method and apparatus for authenticating a legitimate article and detecting a counterfeit article in which the legitimate article has a label which includes an isotope in a natural or unenriched state or an isotope which is enriched to a predetermined amount. The label is subjected to gamma radiation and the radiation is measured with the source of radiation being stationary and then with the source of radiation being vibrated. The measurements are then compared in order to determine the authenticity of the article.

2. Description of the Prior Art

As a result of technology advances in copying techniques and reproduction techniques, many articles are becoming very vulnerable to being counterfeited. This problem is becoming particularly acute in items such as credit cards, video tapes, cassette tapes, designer fashion accessories and clothing. In addition, an even more serious problem is occurring with regard to the counterfeiting of currency and other financial paper. A related problem is the unauthorized use of a financial item, such as a credit card, registered security or identity document.

Many techniques have been developed for labelling articles to prevent counterfeiting or fraudulent use. Techniques such as holograms on credit cards and magnetic coding on various articles have been in use for some time. These prior art techniques have been less than fully effective either because the counterfeiters have found ways to duplicate the label, or the apparatus for detecting the label and verifying its authenticity, has been too expensive to be utilized in the quantities necessary for preventing counterfeiting.

SUMMARY OF THE INVENTION

It is the primary object of the present invention to provide a method and apparatus for determining whether an article is authentic.

It is another object of the present invention to provide a method and apparatus for determining if an article is authentic in which a label for the article is inexpensive to manufacture, and the apparatus for detecting the label is relatively inexpensive.

It is another object of the present invention to provide a label for an article for the purposes of authenticating the article when the label is invisible and will in no way interfere with the text, logo, or design of the article, and wherein the label cannot be transferred from one article to another without destroying the usefulness of the label.

It is another object of the present invention to provide a label which not only determines the authenticity of the article, but which also carries additional stored data. A suitable apparatus for either reading or confirming this data is a further object of this invention.

The present invention is directed to a counterfeit detecting apparatus for detecting the authenticity of an article having a label containing an isotope of a chemical element in a natural or unenriched state or in a state in which it is enriched to a predetermined amount. The apparatus comprises a housing, a source of gamma radiation positioned in the housing, and a gamma radiation detector positioned in the housing for detecting the radiation from the source. The gamma radiation source is selected to emit radiation which can stimulate a selected nuclear transition in the label material in the known manner of the Mossbauer effect. Structure is provided in the housing for receiving the article and positioning at least a portion of the article in the housing such that the label is positioned between the source and the detector. A vibrating member vibrates the source such that the frequency of the gamma radiation therefrom is shifted. A calculating device, such as a microprocessor, is coupled to the detector for calculating the ratio of the number of gamma rays counted by the detector during a predetermined period of time when the article is not in position near the receiving member ($N_O$) to the number of gamma rays counted by the detector during a period of time equal to the predetermined period when the article is positioned near the receiving member ($N_R$), and for calculating the ratio of the number of gamma rays counted by the detector during the period of time when the article is not in position near the receiving member ($N_O$) to the number of gamma rays counted during a period of time equal to the predetermined period when the source is vibrated by the vibrating device ($N_E$) and for calculating the ratio $(N_R/N_O)/(N_E/N_O)$ and thus $N_R/N_E$. An output device produces an output indicating whether or not $N_R/N_E$ and $N_E/N_O$ are within a predetermined range.

The present invention is also directed to a method of reading a label on an article where the label includes an isotope of a chemical element which may be in a natural or unenriched state or enriched by a predetermined amount. The method comprises steps of counting the number of gamma rays received from a source of gamma rays by a gamma ray detector during a predetermined period of time ($N_O$) and then placing the article between the source of gamma radiation and the gamma radiation detector. The gamma rays received by the detector are counted for a period of time equal to the predetermined period of time ($N_R$) and then a relative vibrating movement is established between the source and the detector. The gamma rays received by the detector are again counted for a period of time equal to the predetermined period of time while there is relative vibrating movement between the course and the detector ($N_E$). The ratios $N_R/N_O$, $N_E/N_O$, and $N_R/N_E$ are calculated, and then an indication is provided as to whether the ratio $N_R/N_E$ and $N_E/N_O$ are within one of several predetermined ranges.

Also, the present invention is directed to an article capable of being authenticated, in which the article comprises a body substantially transparent to the gamma rays and a label fixed to the body. The label includes an isotope of a chemical element which may be in a natural or unenriched state or which may be enriched to a predetermined amount.

BRIEF DESCRIPTION OF THE DRAWINGS

FIG. 1A is a graph showing the gamma ray absorption spectrum of the label of the present invention.

FIG. 1B is a graph showing the gamma ray spectrum of the source of the present invention.

FIG. 2 illustrates a credit card incorporating a label of the present invention.

DETAILED DESCRIPTION OF THE PREFERRED EMBODIMENT

Figure 3:
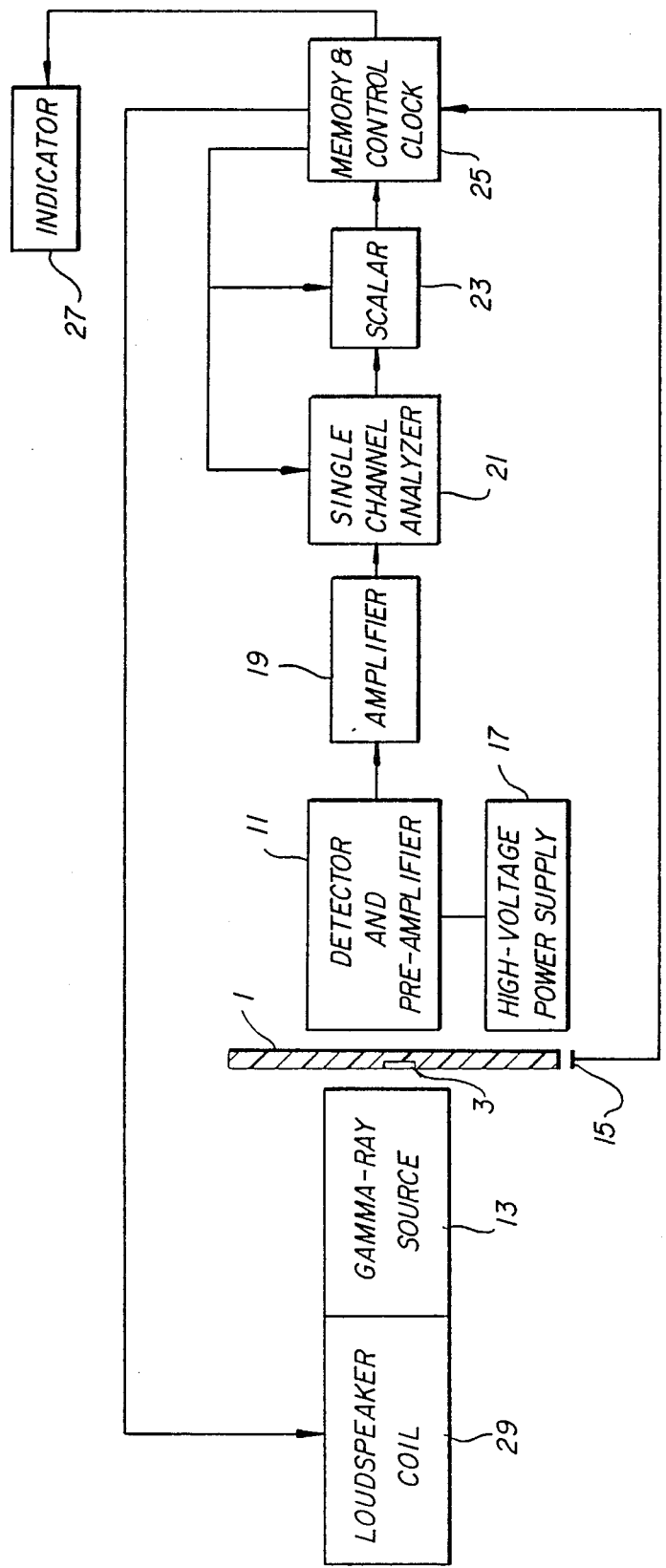
FIG. 3 is a block diagram of the apparatus of the present invention.

The present invention is based upon the principal that one can measure nuclear resonant absorption (known as the Mossbauer effect) relative to standard electronic absorption with a material having an element with an isotope capable of resonantly absorbing gamma rays. The isotope may be in an unenriched or natural state or may be enriched. While the electronic absorption of gamma rays determines the amount of given chemical element in the sample, the nuclear absorption determines the amount of a particular isotope in the sample.

In the present invention, a label containing the isotope is positioned between a suitable source which admits a substantially single energy gamma ray, i.e., a gamma ray spectrum of extremely well defined energy or frequency, and a suitable gamma ray detector. Electronic absorption plus nuclear absorption ($N_R$) is measured by measuring the decrease in the number of gamma ray photons reaching the detector when the label is positioned between the source and the detector as compared with the number of gamma ray photons reaching the detector from the source in the absence of the label ($N_O$) for the same time interval. Electronic absorption ($N_E$) is then measured by displacing the energy of the gamma ray from the energy of the gamma ray resonance in the label. This is accomplished by vibrating the source in order to create a Doppler shift in the gamma radiation. See G. K. Wertheim, "Mossbauer Effect, Principles and Applications", Academic Press, New York and London, 1964.

Referring to FIGS. 1A and 1B, FIG. 1A shows the number of counts of gamma rays absorbed as a function of frequency or photon energy level by the isotope in the label. As can be seen at frequency R, absorption is the greatest since the absorption is both electronic absorption and nuclear absorption. The area in which there is electronic absorption and nuclear absorption is a relatively narrow frequency range. FIG. 1B shows the number of gamma rays generated by the source as a function of frequency. As can be seen, the gamma rays are generated at a particular resonant frequency. The isotopes selected for use with the present invention have a very narrow resonant frequency range. When the source is vibrated, there is a Doppler shift of the resonant frequency. As can be seen in comparing FIGS. 1A and 1B, the Doppler shift of the source moves the frequency of the gamma rays outside of the range of nuclear absorption of the label. Thus, when the gamma rays from the source undergo the Doppler shift, there is no nuclear absorption of the photons by the label and the number of counts is significantly higher.

By way of example, the present invention will be described for use with a credit card made of a plastic material. However, the label of the present invention can also be used in paper articles such as currency, passports, financial documents, identifying labels, etc.

The material for the label will include a particular isotope in its natural or unenriched state or in a state enriched over its natural abundance in a material such as a metal oxide of the element. The isotope material is prepared as a uniform suspension in a plastic sheet such as lucite or polyvinyl chloride, or as a suspension in printing ink. A typical label will be approximately 1 cm $\times$ 1 cm $\times$ 0.025 cm and the label will contain typically about 6 milligrams of the particular isotope. Referring to FIG. 2, the label is sealed into the credit card 1 in such a way that no strongly absorbing material interferes with the passage of gamma rays through the card and the internally sealed label 3. No metal tabs should be sealed into the card at the location of the label and the label should probably not be positioned in an area where there is embossing since the variable thickness of the embossed area could influence the measurements. Also, the label should be positioned in an area way from the magnetic tape which is used in some credit cards. Ideally, the position of the label would be in the center of the card so that the card can be inserted into the detection device in any orientation. However, as the position of the label cannot be detected without use of the detection apparatus described here, the position itself can be one form of imbedded data.

The isotopes to be used in the labels could, for example, be iron-57 ($^{57}$Fe), europium-151 ($^{151}$Eu), and tin-119 ($^{119}$Sn) as absorbers. These are all stable, non-radioactive isotopes which pose no health or environmental risk if they are introduced widely into credit cards which will be held on the person of each cardholder. In conjunction with the isotopes used in the label, a corresponding gamma ray source for these isotopes is used as the gamma ray source in the detector apparatus. In particular, the isotopes are cobalt-57 ($^{57}$Co), samarium-151 ($^{151}$Sm), and tin-119-metastable ($^{119m}$Sn), respectively. The level of radioactivity of these sources is at a low enough level so that with the shielding provided by the encapsulation of the source itself, and with the metallic housing of a closed chamber containing the detection apparatus, the radioactivity of these devices would be at a level below that of natural radioactive sources and, therefore, well within government mandated standards for the introduction of radioactive substances into general circulation.

One example of an absorber for a label and a source is $^{151}$Eu as the absorber and $^{151}$Sm as the source. The $^{151}$Eu would be in its natural or unenriched state or it could be enriched above its natural abundance level (47.8%). The europium could be used in an oxide form, such as $Eu_2O_3$, which is the chemical form in which it is usually furnished. The $^{151}$Sm used as the source is available inexpensively as a fission-fragment. The source and absorber should be of the same composition, i.e., $Sm_2O_3$ and $Eu_2O_3$. Other chemical forms are also possible.

The samarium oxide $^{151}Sm_2O_3$ is a fission product available at an activity level of about 25 Curies/gm. The half-life for the source is 90 years so that its decay would not require source replacement in the detection apparatus during the useful lifetime of the apparatus. $^{151}$Sm decays to $^{151}$Eu by beta decay with emission of an electron. Only about 0.06% of the nuclear decays involve the emission of a gamma ray. The gamma ray energy is 21.7 keV. Only the gamma ray escapes the sealed encapsulation of the source with the decay electron being absorbed in the source window and thus, the source poses no hazard to the user. A 5 mg sample of $^{151}Sm_2O_3$ (total activity 125 mCi) will emit 2.25 ×10$^6$ gamma ray photons/sec. Self absorption in the source will be about 50%. The fraction of all photons leaving the source which will fall in the gamma ray detector will be about 10% of the total leaving the source. This is because the detector only subtends about $0.4\pi$ steradians of source solid angle. Absorption by the sample itself will be about 30% of the photons passing through it. The effective efficiency of the detector after introducing an energy filtering window will be about 60%. Thus, the average number of gamma ray photons falling on the detector per second will be about $5 \times 10^4$ photons/secs. In a 10 second counting time, the accuracy in the recorded number of counts will then be 0.15% according to well known rules of statistics which govern radioactive decays. Should the credit card having higher absorption, or the source have weaker intensity such that the counting rate is reduced to only $10^4$ photons/sec., the accuracy of the measurement will be reduced by 0.30%. This accuracy would also be achieved if the counting time were reduced to 2 seconds.

The counterfeit detection apparatus of the present invention is described with reference to FIG. 3. The credit card 1 with label 3 is positioned between a detector 11 and gamma ray source 13 through a slot in the housing of the apparatus. The detection apparatus can include a switch 15 which is turned on by the insertion of the credit card 1, or alternatively, a manual or automatic type of switch can be used to turn on the apparatus. The detector 11 is a gamma ray counting device comprising a scintillation crystal mounted on a photomultiplier tube. The crystal could typically be sodium-iodide (NaI(T1). Gamma ray counting devices of this type are commercially available. High voltage power supply 17 is used to energize the photomultiplier in the detector 11. The output of the detector 11 is applied through amplifier 19 to a single channel analyzer 21. The single channel analyzer 21 accumulates only the counts corresponding to the energy of the gamma ray from the source. The device functions as an energy window for the detection of gamma rays, thus, reducing interference from background radiation and other sources of stray photomultiplier pulses. The output of the single channel analyzer is applied to scaler 23 which counts the number of pulses from the single channel analyzer in the predetermined time intervals. The output of the scaler is applied to memory and control device 25. The memory in control device 25 stores the accumulated counts during the three stages of measurement. The device is capable of performing the numerical operations such as adding, subtracting, and dividing the numerical counts to compare numbers and to make logical decisions and includes a clock for counting predetermined periods of time. Furthermore, the device controls the sequence of operations of the detector. The output of the memory in control device 25 is applied to an indicator 27 which provides an indication as to whether the credit card is authentic or not.

The gamma ray source 13 is physically connected to the moving core of a loudspeaker coil 29 such as shown in G. K. Wertheim, page 22. The loudspeaker coil vibrates the gamma ray source at the AC line frequency of 50-60 Hz for a predetermined period of time during the measurement process. This vibration causes Doppler shifts in the frequency or energy level of the emitted gamma rays. This shift causes the gamma radiation to shift from the resonant frequency of the enriched isotope in label 3. In other words, the vibration of the gamma ray source 13 by the loudspeaker coil 29, detunes the source away from the nuclear resonance of the $^{151}$Eu in the label.

In performing the method of the present invention as, for example, with a credit card to test the authenticity of the credit card, the number of photons reaching the detector is counted for a predetermined period of time. e.g., 10 seconds. The card containing a label composed of $Eu_2O_3$ is then introduced into a slit in the detector enclosure, such as a metal box. The card is positioned between the radioactive source $Sm_2O_3$ and the detector (NaI(T1). The number of photons reaching the detector ($N_R$) is counted for the predetermined period of time of 10 seconds. The source is then vibrated by the loudspeaker at a velocity of 3 cm/sec. peak velocity at a frequency of 50 Hz with an amplitude of 0.1 mm, and the number of photons reaching the detector ($N_E$) in 10 seconds is counted. The memory in control circuit 25 then compares both $N_R$ and $N_E$ with $N_O$, the number of photons reaching the detector without the label in place. This number, $N_O$, has been stored in the memory from a count during 10 seconds prior to inserting the card to be tested.

The electronic circuitry in device 25 calculates the ratios $N_E/N_O$ and $N_R/N_O$. The ratio $N_E/N_O$ expresses the reduction of gamma rays due to the electronic absorption and thus, measures the quantity of europium and other chemicals in the label. The second ratio, $N_R/N_O$, expresses the fractional reduction of gamma radiation due to both electronic absorption and nuclear resonant absorption (i.e., the Mossbauer effect). The ratio $N_R/N_E$ expresses the reduction due to pure nuclear absorption.

As an illustrative example, a credit card having a label which includes $^{151}Eu_2O_3$ is enriched to 95%. In the apparatus, $N_O$ equals 400,000. With a sample of 5 mg/cm$^2$ of $^{151}Eu_2O_3$ sealed into polyvinyl chloride of 0.05 cm thickness, the ratio $N_E/N_O$ equals $0.730\pm0.002$, and the ratio $N_R/N_O$ equals $0.6931\pm0.002$, and thus, $N_R/N_E$ equals $0.950\pm0.002$. A label such as that produced by a counterfeiter using natural unenriched europium would have the same $N_E/N_O$ for the same amount of europium, however, $N_R/N_O$ equals $0.712\pm0.002$ such that $N_R/N_E$ equals $0.975\pm0.002$. The control device 25 and indicator 27 are programmed to pass a card with ratios $N_E/N_O$ and $N_R/N_O$ within predetermined ranges of the calibrated values for enriched europium in the label, say below 0.960. Thus, the ratio $N_R/N_E$ in the counterfeit card would not fall within the predetermined range passed by the control device and indicator. Of course, with no label on the card at all, the detector would find $N_R/N_E = 1$, which is also outside of the acceptable range.

Labels may also be produced using natural unenriched isotopes. Such labels may be useful in protecting items against counterfeiting where the very high degree of security afforded by the use of enriched isotopes is not required. For example, if unenriched $Eu_2O_3$ is used, a sample of 10 mg/cm$^2$ of natural $Eu_2O_3$ sealed into polyvinyl chloride of 0.05 cm thickness would have the ratio $N_E/N_O$ equal to $0.641\pm0.002$ and would have the ratio $N_R/N_O$ equal to $0.608\pm0.002$. Thus $N_R/N_E$ would equal $0.949\pm0.002$. The control device 25 and indicator 27 are here programmed to pass a label with $N_R/N_E$ less than a predetermined level, for example less than 0.970. Otherwise the indicator would indicate that the item had failed the test. A further requirement could also be preprogrammed into the control device, namely that the ratio $N_E/N_O$ must be greater than a predetermined value, for example 0.600, in order for the indicator to pass the labeled item. By requiring that both tests be passed for each item, the degree of security for each labeled item would be increased, since it might be possible to simulate one or another of the predetermined ratios with some combination of $Eu_2O_3$ and other materials, but more difficult to simulate both ratios without using the prescribed formulation.

The examples given above are intended to be illustrative. For different substrate materials (other than polyvinyl chloride) the gamma ray absorption will be different, while for improved $Sm_2O_3$ source design the nuclear resonance absorption may be larger, due to a larger recoil-free fraction of emmitted gamma ray photons. Such quantitative variations will not change the underlying principals of operation for the method and apparatus described herein.

The present invention may be embodied in other specific forms without departing from the spirit of essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A counterfeit detecting apparatus for detecting the authenticity of an article having a label containing an isotope of a chemical element, said apparatus comprising:
   (a) a housing;
   (b) a source of gamma radiation positioned in said housing, said source being subject to the Mossbauer effect, when employed with a particular isotope in the label;
   (c) gamma radiation detector means positioned in said housing for detecting radiation from said source;
   (d) receiving means in said housing for enabling at least a portion of the article to be inserted therein such that the label is positioned between said source and said detector means;
   (e) vibrating means for vibrating said source such that the frequency of the gamma radiation therefrom is shifted;
   (f) calculating means coupled to said detector means for calculating the ratio of the number of gamma rays counted by said detector means, during a predetermined period of time, when the article is not positioned by said receiving means ($N_O$) to the number of gamma rays counted by said detector means, during a period of time equal to said predetermined period, when the article is positioned by said receiving means ($N_R$), and for calculating the ratio of the number of gamma rays counted by said detector means, during the predetermined period of time when the article is not positioned by said receiving means ($N_O$), to the number of gamma rays counted during a period of time equal to the predetermined period when said source is vibrated by said vibrating means ($N_E$) and for calculating the ratio $N_R/N_E$; and
   (g) output means for provrding an output indicating whether $N_R/N_E$ is within a predetermined range.

2. A counterfeit detecting apparatus as set forth in claim 1, wherein said vibrating means includes a loudspeaker coil.

3. A counterfeit detecting apparatus as set forth in claim 1, wherein said calculating means includes a memory for storing data and the control sequence of said apparatus, a clock, control means for controlling the operation of said apparatus and calculator means for performing various calculating functions.

4. A counterfeit detecting apparatus as set forth in claim 1, wherein said gamma radiation detector means comprises a scintillation crystal mounted on a photomultiplier tube.

5. A counterfeit detecting apparatus as set forth in claim 4, wherein said gamma radiation detector means includes a single channel analyzer coupled to said photomultiplier tube, wherein said single channel analyzer accumulates only counts corresponding to the energy of the gamma radiation from said source.

6. A counterfeit detecting apparatus as set forth in claim 1, wherein said source comprises cobalt-57 ($^{57}Co$).

7. A counterfeit detecting apparatus as set forth in claim 1, wherein said source comprises tin-119-metastable ($^{119m}Sn$).

8. A counterfeit detecting apparatus as set forth in claim 1, wherein said source comprises samarium-151 ($^{151}Sm$).

9. A counterfeit detecting apparatus as set forth in any one of claims 1-8, wherein said isotope is in an unenriched state.

10. A method of reading a label affixed to an article, said label including an isotope of a chemical element, said method comprising the steps of:
    (a) counting the number of gamma rays received from a source of gamma rays by a gamma ray detector during a predetermined period of time ($N_O$);
    (b) placing the article between the source of gamma radiation and the gamma radiation detector;
    (c) counting the gamma rays received by the detector for a period of time equal to the predetermined period of time ($N_R$);
    (d) establishing a relative vibrating movement between the source and the detector;
    (e) counting the gamma rays received by the detector for a period of time equal to the predetermined period of time while there is relative vibrating movement between the source and the detector ($N_E$);
    (f) calculating the ratios $N_R/N_O$, $N_E/N_O$, and $N_R/N_E$; and
    (g) providing an indication of whether $N_R/N_E$ is within a predetermined range.

11. The method of claim 10, wherein the source is vibrated with respect to the detector at a rate of 50-60 Hz.

12. The method of any one of claims 10 or 11, wherein said isotope is in an unenriched state.

13. An article capable of being authenticated, said article comprising a non-metallic body and a label fixed to said body, said label including an isotope of a chemical element.

14. An article as set forth in claim 13, wherein said isotope is iron-57 ($^{57}Fe$).

15. An article as set forth in claim 13, wherein said isotope is tin-119 ($^{119}Sn$).

16. An article as set forth in claim 13, wherein said isotope is europium-151 ($^{151}Eu$).

17. An article as set forth in claim 13, wherein said body is plastic.

18. An article as set forth in claim 13, wherein said body is paper.

19. An article as set forth in any one of claims 13-18, wherein said isotope is in an unenriched state.

* * * * *